United States Patent
Fushimi et al.

(10) Patent No.: US 8,034,735 B2
(45) Date of Patent: Oct. 11, 2011

(54) CATALYST COMPONENT FOR THE POLYMERIZATION OF OLEFINS

(75) Inventors: Masaki Fushimi, Eschborn (DE); Maria Schmitt, Burgberg (DE); Martin Schneider, Hochheim (DE); Giampiero Morini, Padua (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 0 days.

(21) Appl. No.: 12/312,592

(22) PCT Filed: Nov. 14, 2007

(86) PCT No.: PCT/EP2007/009852
§ 371 (c)(1),
(2), (4) Date: Jan. 8, 2010

(87) PCT Pub. No.: WO2008/061662
PCT Pub. Date: May 29, 2008

(65) Prior Publication Data
US 2010/0120998 A1    May 13, 2010

Related U.S. Application Data

(60) Provisional application No. 60/872,997, filed on Dec. 5, 2006.

(30) Foreign Application Priority Data

Nov. 21, 2006   (EP) .................................... 06024132

(51) Int. Cl.
*C08F 2/00* (2006.01)
*B01J 37/00* (2006.01)
*B01J 31/00* (2006.01)

(52) U.S. Cl. ......... 502/126; 502/156; 502/172; 526/209

(58) Field of Classification Search .................... 502/126
See application file for complete search history.

(56) References Cited

U.S. PATENT DOCUMENTS

| | | |
|---|---|---|
| 4,220,554 A | 9/1980 | Scatá et al. |
| 4,399,054 A | 8/1983 | Ferraris et al. |
| 4,469,648 A | 9/1984 | Ferraris et al. |
| 4,829,034 A | 5/1989 | Iiskolan et al. |
| 4,971,937 A | 11/1990 | Albizzati et al. |
| 4,978,648 A | 12/1990 | Barbé et al. |
| 5,055,535 A | 10/1991 | Spitz et al. |
| 5,100,849 A | 3/1992 | Miya et al. |
| 5,122,492 A | 6/1992 | Abizzati et al. |
| 5,387,749 A | 2/1995 | Govoni et al. |
| 5,726,262 A | 3/1998 | Kioka et al. |
| 5,733,987 A | 3/1998 | Covezzi et al. |
| 6,197,264 B1 * | 3/2001 | Korhonen et al. ............ 422/136 |
| 6,228,956 B1 | 5/2001 | Covezzi et al. |
| 2002/0086794 A1 | 7/2002 | Sacchetti et al. |
| 2004/0259721 A1 * | 12/2004 | Matsunaga et al. ........... 502/103 |
| 2005/0096389 A1 * | 5/2005 | Gao et al. ...................... 514/548 |
| 2005/0215424 A1 | 9/2005 | Dall'Occo et al. |
| 2007/0144402 A1 | 6/2007 | Booth et al. |

FOREIGN PATENT DOCUMENTS

| | | |
|---|---|---|
| EP | 0362705 | 11/1990 |
| EP | 1505084 A1 * | 2/2005 |
| JP | 2003-183318 | 7/2003 |

OTHER PUBLICATIONS

Kim, et al., "Copolymerization of Ethylene and 1-Butene with Highly Active $TiCl_4/THF/MgCl_2$, $TiCl_4/THF/MgCl_2/SiO_2$, and $TiCl_3 1/3 AlCl_3$ Catalyst," *Journal of Polymer Science: Part A: Polymer Chemistry*, 32, (1994), pp. 2979-2987.

* cited by examiner

*Primary Examiner* — David Wu
*Assistant Examiner* — Elizabeth Eng
(74) *Attorney, Agent, or Firm* — Dilworth IP, LLC

(57) ABSTRACT

A catalyst component for the polymerization of olefins comprises Mg, Ti, halogen, and an alpha-omega-diether represented by the general formula: $(RO)-(CR^1R^2)_n-(OR)$, wherein the number of n is from 5 to 10, R is an alkyl, cycloalkyl or aryl radical containing 1 to 12 carbons, and $R^1$ and $R^2$ are independently from each other hydrogen, an alkyl, cycloalkyl or aryl radical containing 1 to 12 carbons. The catalysts prepared with such component provide a high mileage for the production of polyolefins with a high bulk density of the polymer produced in gas-phase polymerization process or in slurry polymerization process. Such catalyst produces narrower MWD PE, if compared with other catalyst systems.

12 Claims, No Drawings

CATALYST COMPONENT FOR THE POLYMERIZATION OF OLEFINS

The instant invention relates to a catalyst component for the polymerization of ethylene or mixtures of ethylene with olefins such as $CH_2=CHR$, wherein R is an alkyl, cycloalkyl or aryl radical having 1 to 12 carbon atoms, comprising Ti, Mg, halogen, and an alpha-omega-diether compound.

The catalyst of this invention is suitably used in (co)polymerization processes of ethylene to prepare (co)polymers having narrow Molecular Weight Distribution (MWD) and high bulk density with keeping a high productivity.

The MWD is an important feature of ethylene polymers in that it affects both the rheological behavior, and therefore the processability, and also the final mechanical properties. In particular, polymers with narrow MWD are suitable for films and injection molding in that deformation and shrinkage problems in the manufactured article are minimized. The width of the molecular weight distribution for the ethylene polymers is expressed as melt flow ratio MFR, which is the ratio between the melt index measured under a load of 21.6 kg (melt index condition F) and that measured under a load of 2.16 kg (melt index condition E). The measurements of melt index are carried out according to ASTM D-1238 at a temperature of 190° C.

Catalysts for preparing ethylene (co)polymers having narrow MWD are described in EP 373 999. The known catalyst comprises a solid catalyst component consisting of a titanium compound supported on magnesium chloride, an alkyl-Al compound and an electron donor compound selected from monoethers. It is shown that the catalyst provides a good performance in the aspect of making narrow MWD polymers only by the combination of diisobuthylphthalate as internal donor, but the catalyst's activity is rather poor for its use for current commercial production.

The use of donor compound as a catalyst component for the polymerization of olefins is described in many publications up to now. Particularly, tetrahydrofuran (THF) is well known as one of effective donors for ethylene polymerization catalysts (Jae ha Kim et al., Journal of Polymer Science: Part A: Polymer Chemistry, 32, 2979 (1994)). This is because that compound is very simple and available at low cost. Furthermore, THF is able to provide a very promising performance for improving the polymer properties with keeping in high polymer productivity. The only disadvantage for the use of THF is that it is difficult to obtain polymers with narrow molecular weight distribution due to, maybe, the difficulty for distributing it homogenously onto the catalyst's surface because of the small size of THF.

Some examples of alpha-omega-diether compounds are mentioned in the prior art as a catalyst component for the polymerization of olefins. For example, EP 361 494 describes 1,2-dimethoxyethane and its use as internal donor in the preparation of catalysts for the stereospecific polymerization of propylene. However, in comparison example 3 of this publication, it is disclosed that it displayed rather poor properties in term of both activity and stereospecificity, as well.

WO 2003/106511 also describes a polymerization catalyst containing 1,2-dimethoxyethane and 1,3-dimethoxypropane as internal donor suitable for the preparation of LLDPE in Experimental 4 to 7 and Experimental 10, respectively. The undesirable part for LLDPE, which is measured by the xylene soluble part, is reduced by the use of those catalysts, but the productivity remained in low.

1,3-dimethoxypropane is also described as an internal donor for the preparation of polyethylene catalyst at Experimental 5 in JP 2003-183318. The bulk density of the polymer produced is very much improved by the use of this catalyst. MWD represented by the value of HLMI/MI (MFR) is also narrowed compared with the catalyst which is prepared without internal donor, but it is not satisfied with the current commercial requirement.

1,4-dimethoxybutane is listed as one of preferable compounds in WO 2005/52068, but there are no experimental data given at all demonstrating its properties for the artisan.

Under such circumstances, there is still an ongoing demand for polymerization catalyst suitable for the (co)polymerization of ethylene and resulting into (co)polymers having a narrow MWD combined with high bulk density while keeping a high productivity, simultaneously.

On the other hand, any disclosure concerning the employment of alpha-omega-diether compounds represented by the formula: $(RO)-(CR^1R^2)_n-(OR)$, wherein the number of n is from 5 to 10, R is an alkyl, cycloalkyl or aryl radical containing 1 to 12 carbons, and $R^1$ and $R^2$ are hydrogen, an alkyl, cycloalkyl or aryl radical containing 1 to 12 carbons and the unit is validated eventhough the different structure, particularly for the catalyst component of olefin polymerization are obviously not available, so far.

The inventors have surprisingly found the catalyst component as mentioned above capable of satisfying the above-mentioned demand comprising Ti, Mg, halogen as essential elements and containing an alpha-omega-diether compound as internal donor (ID) or also as external donor (ED).

The instant invention, thus, pertains to a catalyst component for the polymerization or co-polymerization of olefins comprising: Ti, Mg, halogen and an alpha-omega-diether compound represented by the general formula: $(RO)-(CR^1R^2)_n-(OR)$, wherein the number of n is from 5 to 10, R is an alkyl, cycloalkyl or aryl radical containing 1 to 12 carbons, and $R^1$ and $R^2$ are independently from each other hydrogen, an alkyl, cycloalkyl or aryl radical containing 1 to 12 carbons.

In a preferred embodiment of the instant invention the alpha-omega-diether compound comprises a strait chain, wherein $R^1$ and $R^2$ are hydrogen. More preferred the compound comprises a number n of carbon atoms in the chain of from 5 to 7, most preferred n stands for 5 or 6.

Preferred examples of alpha-omega-diether compounds can be listed as follow; 1,5-dimethoxypentane, 1,5-diethoxypentane, 1,5-dipropoxypentane, 1,5-dicyclopentoxypentane, 1,5-diphenoxypentane, 1,6-dimethoxyhexane, 1,6-diethoxyhexane, 1,6-dipropoxyhexane, 1,6-dicyclopentoxyhexane, and 1,6-diphenoxyhexane, 1,7-dimethoxyheptane, 1,7-diethoxyheptane, 1,8-dimethoxyoctane, 1,8-diethoxyoctane, 1,9-dimethoxynonane, 1,9-diethoxynonane, 1,10-dimethoxydecane and 1,10-diethoxydecane.

Among these preferred compounds, 1,5-dimethoxypentane, 1,5-diethoxypentane, 1,6-dimethoxyhexane, 1,6-diethoxyhexane, 1,7-dimethoxyheptane, 1,8-dimethoxyoctane, 1,9-dimethoxynonane and 1,10-dimethoxydecane are even more preferred.

Particularly preferred is a solid catalyst components in which the Ti atoms derived from a titanium compound which contains at least one Ti-halogen bond and the Mg atoms derive from magnesium chloride. In a still more preferred aspect both the titanium compound and the alpha-omega-diether are supported on magnesium dichloride.

In a particular embodiment, the magnesium dichloride is in active form. The active form of magnesium dichloride present in the catalyst components of the invention is recognizable by the fact that in the X-ray spectrum of the catalyst component the major intensity reflection which appears in the spectrum of the non-activated magnesium dichloride (having usually surface area smaller than 3 m²/g) is no longer present, but in its place there is a halo with the position of the maximum intensity shifted with respect to the position of the major intensity reflection, or by the fact that the major intensity reflection presents a half-peak breadth at least 30% greater than the one of the corresponding reflection of the non-activated Mg dichloride. The most active forms are those in which the halo appears in the X-ray spectrum of the solid catalyst component.

In the case of the most active forms of magnesium dichloride, the halo appears in place of the reflection which in the spectrum of the non-activated magnesium chloride is situated at the inter-planar distance of 2.56 angstrom.

Preferred titanium compounds are the halides or compounds of the general formula $TiX_n(OR^1)_{4-n}$, where $1<=n<=3$, X is halogen, preferable chloride, and $R^1$ is $C_1$ to $C_{10}$ hydrocarbon group.

Especially preferred titanium compounds are titanium tetrachloride and the compounds of formula $TiCl_3OR^1$ where $R^1$ has the meaning given above and in particular selected from methyl, n-butyl or iso-propyl.

The preparation of the solid catalyst components can be performed using various methods known until now.

For example, the magnesium chloride (preferable used in a form containing less than 1% of water), and the alpha-omega-diether can be milled together under conditions that cause the activation of the magnesium dichloride; the milled product is then caused to react one or more times with $TiCl_4$ in excess, optionally in the presence of an electron donor, at a temperature ranging from 80 to 135° C., and then repeatedly washed with a hydrocarbon liquid such as hexane at room temperature. The washing is reiterated until any chlorine ions cannot be detected any longer in the wash liquid.

A preferred method comprises the reaction between magnesium alcoholates or chloroalcoholates, in particular chloroalcoholates prepared pursuant to U.S. Pat. No. 4,220,554, with the alpha-omega-diether. The result, then, is reacted with $TiCl_4$ in excess. In this case, the operation takes place preferably at a temperature in the range between 80 and 135° C.

The reaction with $TiCl_4$, in the optional presence of alpha-omega-diether, may be repeated and the solid is then washed with hexane to eliminate the non-reacted $TiCl_4$.

In a further preferred method, a $MgCl_2$-nROH adduct, particularly in the form of spheroidal particles, where n is generally from 1 to 6, and ROH is an alcohol, preferably ethanol, is caused to react with an alpha-omega-diether and optionally one of the above mentioned hydrocarbon solvents. It is thereafter reacted with $TiCl_4$ in excess. The reaction temperature initially ranges from 0 to 25° C., and is then increased to 80 to 135° C. Then, the solid may be reacted once more with $TiCl_4$, in the optional presence of alpha-omega-diether, separated and washed with a liquid hydrocarbon until no chloride ions can be detected any longer in the wash liquid.

The $MgCl_2$-nROH adduct can be prepared in spherical shape from melted adducts or by emulsifying the adduct in a liquid hydrocarbon and thereafter causing it to solidify by fast quenching. Representative methods for the preparation of these spherical adducts are reported for example in U.S. Pat. No. 4,469,648, U.S. Pat. No. 4,399,054, and WO 1998/44009. Another useable method for the spherulization is the spray cooling described for examples in U.S. Pat. Nos. 5,100,849 and 4,829,034.

The catalyst components obtained with this method can have size ranging from 1 to 150 μm to preferably from 5 to 100 μm.

In a preferred aspect of the instant invention, before being reacted with the titanium compound, before being reacted with the alpha-omega-diether, the spheroidal adducts are subjected to thermal de-alcoholation or chemical de-alcoholation by such as $SiCl_4$ or triethylaluminum at a temperature ranging from 50 and 150° C. until the alcohol content is reduced to values lower than 2 and preferably ranging from 1.5 and 0.3 mols per mol of magnesium chloride.

Optionally, said dealcoholated adducts can be finally treated with chemical reagents capable of reacting with the OH groups of the alcohol and, thus, further dealcoholating the adduct until the content is reduced to values which are generally lower than 0.5 mols.

The molar ratio of alpha-omega-diether/$MgCl_2$ used in the reactions indicated above preferably ranges from 0.01 to 10, preferably from 0.1:6.

The catalyst component according to the present invention is converted into catalysts for the polymerization of olefins by reaction them with organoaluminum compounds according to known methods.

In particular, the present invention pertains also to a catalyst for the polymerization of olefins $CH_2=CHR$, in which R is hydrogen or a hydrocarbon radical with 1 to 12 carbon atoms, comprising the product of the reaction between:

(a) a solid catalyst component as described above,
(b) an alkylaluminum compound and, optionally,
(c) an external donor compound.

The alkyl-Al compound can preferably be selected from the trialkyl aluminum compounds such as for example trimethylaluminum (TMA), triethylaluminum (TEA), triisobutylaluminum (TIBA), tri-n-butylaluminum, tri-n-hexylaluminum, tri-n-octylaluminum. Also alkylaluminum halides and in particular alkylaluminum chlorides such as diethylaluminum chloride (DEAC), diisobutylaluminum chloride, Al-sesquichloride and dimethylaluminum chloride can be used. It is also possible to use, and in certain cases preferred, mixtures of trialkylaluminum's with alkylaluminum halides. Among them mixtures between TEA and DEAC are particularly preferred. The use of TIBA, alone or in mixture is also preferred. Particularly preferred is also the use of TMA.

The external donor compound can be selected from the group consisting of ethers, esters, amines, ketenes, nitriles, silanes and mixtures of the above.

In particular, it can advantageously be selected from the $C_2$ to $C_{20}$ aliphatic ethers and in particular cyclic ether preferably having 3 to 5 carbon atoms cyclic ethers such as tetrahydrofuran (THF), dioxane and diethers presented in the instant invention.

In addition, the electron donor compound can advantageously also be selected from silicon compounds of the general formula $R_a^5R_b^6Si(OR^7)_c$, where a and b are integers from 0 to 2, c is an integer from 1 to 3 and the sum (a+b+c) is 4; $R^5$, $R^6$, and $R^7$, are alkyl, cycloalkyl or aryl radicals with 1 to 18 carbon atoms optionally containing heteroatom. Examples of suitable compounds are listed as follow: (iso-propyl)Si(OCH$_3$)$_3$; (tert-butyl) Si(OCH$_3$)$_3$; (isopropyl)$_2$Si(OCH$_3$)$_2$; (tert-butyl)$_2$Si(OCH$_3$)$_2$; (sec-butyl)$_2$Si(OCH$_3$)$_2$; (isobutyl)$_2$Si(OCH$_3$)$_2$; (sec-butyl)$_2$Si(OCH$_3$)$_2$; (cyclohexyl)Si(OCH$_3$)$_3$; (cyclohexyl)(methyl)Si(OCH$_3$)$_2$; (cyclopentyl)$_2$Si(OCH$_3$)$_2$; (tert-butyl)(methyl)Si(OCH$_3$)$_2$; (tert-hexyl)(methyl)Si(OCH$_3$)$_2$; (tert-butyl)(cyclopentyl)Si(OCH$_3$)$_2$; (tert-hexyl)Si(OCH$_3$)$_3$; (tert-hexyl)Si(OC$_2$H$_5$)$_3$; (tert-butyl)(2-methylpiperidyl)Si(OCH$_3$)$_2$; (tert-butyl)(3-methylpiperidyl)Si(OCH$_3$)$_2$; (tert-hexyl)(piperidyl)Si(OCH$_3$)$_2$; (tert-hexyl)(pyrolidinyl)Si(OCH$_3$)$_2$; (methyl)(3,3,3-trifluoropropyl)Si(OCH$_3$)$_2$; (3,3,3-trifluoropropyl)$_2$Si(OCH$_3$)$_2$.

Particularly preferred are the silicon compounds in which a is 0, c is 3, $R^6$ is a branched alkyl or cycloalkyl group, optionally containing heteroatoms, and $R^7$ is methyl.

Examples of such preferred silicon compounds are (iso-propyl) Si(OCH$_3$)$_3$, (tert-butyl) Si(OCH$_3$)$_3$, (cyclohexyl)Si (OCH$_3$)$_3$ and (tert-hexyl)Si(OCH$_3$)$_3$.

The above mentioned compounds (a) to (c) can be fed separately into the reactor where, under the polymerization conditions, they are allowed to exploit their activity. The pre-contact of the above components, however, constitutes a particular advantageous embodiment, optionally in the presence of small amounts of olefins, for a period of time ranging from 0.1 to 120 minutes, preferably in the range from 1 to 60 minutes. The pre-contact can be carried out in liquid diluents at a temperature ranging from 0 to 90° C., preferably in the range of from 20 to 70° C.

The so formed catalyst system can be used directly in the main polymerization process or, alternatively, it can be pre-polymerized beforehand. A pre-polymerization step is usually preferred when the main polymerization process is carried out in the gas phase. The pre-polymerization can be carried out with any of the olefins CH$_2$=CHR, where R is H or a C$_1$ to C$_{10}$ hydrocarbon rest. In particular, it is especially preferred to pre-polymerize ethylene, propylene or mixtures thereof with one or more alpha-olefins, said mixtures containing up to 20% in moles of alpha-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The pre-polymerized catalyst component can also be subject to a further treatment with a titanium compound before being used in the main polymerization step. In this case the use of TiCl$_4$ is particularly preferred. The reaction with the Ti compound can be carried out by suspending the pre-polymerized catalyst component in the liquid Ti compound optionally in mix with a liquid diluent; the mixture is heated to 60 to 120° C. and kept at this temperature for a time period from 0.5 to 2 hours.

The catalyst of the invention can be used in any kind of polymerization process, preferably both in liquid and gas-phase processes. Catalysts having a small particle size (diameter) of less than 40 µm are particularly suited for slurry polymerization in an inert medium, which can be carried out continuously within stirred tank reactors or in loop reactors. Catalysts having larger particle sizes (diameters) of more than 40 µm are particularly suited for gas-phase polymerization processes which can be carried out in agitated or fluidized bed gas-phase reactors.

Examples of gas-phase processes wherein it is possible to use the catalysts of the invention are described in WO 1992/21706, in U.S. Pat. No. 5,733,987 and in WO 1993/03078. These processes comprise a pre-contact step of the catalyst components, a pre-polymerization step and a gas phase polymerization step in one or more reactors in a series of fluidized or mechanically stirred bed. In a particular embodiment, the gas-phase process can be suitably carried out according to the following steps;

(i) contacting the catalyst components (a), (b) and optionally (c) for a period of time ranging from 0.1 to 120 minutes, at a temperature ranging from 0 to 90° C.; optionally (ii) pre-polymerizing with one or more olefins of formula CH$_2$=CHR, where R is H or a C$_1$ to C$_{10}$ hydrocarbon rest, up to forming amounts of polymer from about 0.1 up to about 1000 g per gram of solid catalyst component (a); and (iii) polymerizing in the gas-phase ethylene, or mixtures thereof with alpha-olefins CH$_2$=CHR in which R is a hydrocarbon radical having 1 to 10 carbon atoms, in one or more fluidized or mechanically stirred bed reactors, in the presence of the product coming from step (i) or (ii).

As already mentioned, the catalyst of the present invention is particularly suitable for preparing ethylene polymers having narrow molecular weight distribution that are characterized by a F/E ratio of lower than 35 and in many cased lower than 30. In combination therewith, particularly in slurry processes, a bulk density of somewhat higher than 3 can be obtained. When the ethylene is polymerized together with a minor amount of an alpha olefin as co-monomer, selected from propylene, buten-1, hexane-1, and octane-1, a linear low density polyethylene having a density lower than 0.940 g/cm$^3$ is obtained with a very good quality indicated by a low ratio of weight of xylene soluble fraction and weight of comonomer in the chain. In addition, the catalyst of the invention also shows the capability of producing polymers with a high bulk density while maintaining a high productivity.

In addition to the ethylene homo- and co-polymers mentioned above the catalysts of the present invention are also suitable for preparing very low density and ultra low density polyethylene (VLDPE and ULDPE, having a density lower than 0.920 g/cm$^3$, to 0.880 g/cm$^3$) consisting of copolymers of ethylene with one or more alpha olefins having from 3 to 12 carbon atoms, having a mole content of units derived from ethylene of higher than 80%. Elastomeric co-polymers of ethylene and propylene and elastomeric terpolymers of ethylene and propylene with smaller portions of a diene having a content by weight of units derived from ethylene of between about 30 and 70% are also possible with advantage.

The following working examples are given in order to further describe the present invention for the skilled artisan more precisely, but in a non-limiting manner.

Characterization

The properties are determined according to the following methods:

Elemental Analysis:

The magnesium contents were determined on the samples digested in a mixture of concentrated nitric acid, phosphoric acid and sulfuric acid by means of an inductively coupled plasma atomic emission (ICP-AES) spectrometer from Spectro, Kleve, Germany, using the spectral lines at 277.982 nm for magnesium.

The titanium content was determined on the samples digested in a mixture of 25% strength sulfuric acid and 30% strength hydrogen peroxide using the spectral line at 470 nm.

The Cl content has been carried out via potentiometric tritration.

Melt Index:

Melt Index (M.I.) are measured at a temperature of 190° C. following ASTM D-1238 under a load of:

2.16 kg, MI E=MI$_{2.16}$ 21.6 kg, MI F=MI$_{21.6}$

The ratio: F/E=MI F/MI E=MI$_{21.6}$/MI$_{2.16}$ is then defined as "melt flow ratio" (MFR).

Fraction Soluble in Xylene:

The solubility in xylene at 25° C. was determined according to the following method: Exactly 2.5 g of polymer and 250 ml of o-xylene were placed in a round bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content:
1-Butene was determined via Infrared Spectrometry.
Effective Density:
ASTM D-1505
General Procedure for the HDPE Polymerization Test:

Into a 1.5 liters stainless steel autoclave, degassed under $N_2$ stream at 70° C., 500 ml of anhydrous hexane, the reported amount of catalyst component and 0.17 g of triethylaluminum (TEA) were introduced (or 0.29 g of TIBA). The mix was stirred, heated to 75° C. and thereafter 4 bar of $H_2$ and 7 bar of ethylene were fed. The polymerization lasted 2 hours. Ethylene was fed to keep the pressure constant. At the end, the reactor was depressurized and the polymer thus recovered was dried under vacuum at 70° C.

EXAMPLE 1

Preparation of Spheroidal $MgCl_2$-EtOH Adduct

A magnesium chloride and alcohol adduct containing about 3 mols of alcohol and having average size of about 12 μm was prepared following the method described in example 2 of U.S. Pat. No. 4,399,054.

Dealcoholating of the Spheroidal $MgCl_2$-EtOH Adduct

Into a 2 l three neck round bottom flask, equipped with a magnetic stirring system, were introduced 70 g of the support (containing 393 mmol of Mg) obtained as described before and 1100 ml of xylene, and at temperature of −10° C., 154 ml of TEA (138 ml/mol in hexane) was drop-wise added over a time period of 1 hour. The mix was then heated to 80° C. and kept under stirring additional 120 minutes at such temperature. After that, the solid was isolated, washed with 600 ml of xylene at 50° C. three times, at room temperature with hexane and finally dried under vacuum at 50° C. for 3 hours.

Preparation of the Solid Component

Into a 250 ml glass flask provided with stirrer, were introduced 7 g of the de-alcoholated support prepared as described before and 100 ml of hexane, and at temperature of 0° C., 1.82 ml of 1,5-dimethoxypentane (Aldrich, 11.6 mmol, ratio donor/Mg=0.25 mol/mol). The mix was heated and kept under stirring for 120 minutes at 50° C., then cooled to room temperature. 7.68 ml of $TiCl_4$ (Fulka, 70 mmol) was charged and was heated at 80° C. for 90 minutes. After that, stirring was discontinued and the liquid siphoned off. Three washings with xylene (100 ml) were performed at 60° C. and then, other three more hexane washings (100 ml) were performed at room temperature. The resulting solid component was discharged and dried under vacuum at about 60° C. for 2 hours.

The resulting solid showed the following characteristics:
Ti: 5.6 wt %
Mg: 15.5 wt %
Cl: 55.0 wt %
1,5-dimethoxypentane: 1.2 wt %

The so prepared catalyst has then been used in the polymerization of ethylene according to the general polymerization procedure. The results are shown in Table 1.

COMPARATIVE EXAMPLE 1

A catalyst component was prepared according to the same procedure described in Example 1 with the only difference is that 1,5-dimethoxypentane was not used.

The said catalyst has then been used in the polymerization of ethylene according to the general polymerization procedure. The results are shown in Table 1.

COMPARATIVE EXAMPLE 2

A catalyst component was prepared according to the same procedure described in Example 1 with the only difference is that THF was used instead of 1,5-dimethoxypentane.

The said catalyst has then been used in the polymerization of ethylene according to the general polymerization procedure. The results are shown in Table 1.

COMPARATIVE EXAMPLE 3

A catalyst component was prepared according to the same procedure described in Example 1 with the only difference is that 1,2-dimethoxyethane was used instead of 1,5-dimethoxypentane.

The said catalyst has then been used in the polymerization of ethylene according to the general polymerization procedure. The results are shown in Table 1.

COMPARATIVE EXAMPLE 4

A catalyst component was prepared according to the same procedure described in Example 1 with the only difference is that 1,3-dimethoxypropane was used instead of 1,5-dimethoxypentane.

The said catalyst has then been used in the polymerization of ethylene according to the general polymerization procedure. The results are shown in the following Table 1.

COMPARATIVE EXAMPLE 5

A catalyst component was prepared according to the same procedure described in Example 1 with the only difference is that 1,4-dimethoxybutane was used instead of 1,5-dimethoxypentane.

The said catalyst has then been used in the polymerization of ethylene according to the general polymerization procedure. The results are shown in the following Table 1.

EXAMPLE 2

A catalyst component was prepared according to the same procedure described in Example 1 with the only difference is that 5.8 mmol of 1,5-dimethoxypentane was used.

The so prepared catalyst has then been used in the polymerization of ethylene according to the general polymerization procedure. The results are shown in Table 1.

EXAMPLE 3

A catalyst component was prepared according to the same procedure described in Example 1 with the only difference is that 5.8 mmol of 1,6-dimethoxyhexane (Aldrich) was used.

The so prepared catalyst has then been used in the polymerization of ethylene according to the general polymerization procedure. The results are shown in Table 1.

EXAMPLE 4

Preparation of the Solid Component

Into a 250 ml glass flask provided with stirrer, were introduced 7 g of the de-alcoholated support prepared as described in Example 1 and 100 ml of hexane, and at room temperature, 7.68 ml of $TiCl_4$ (Fulka, 70 mmol) was charged and was heated at 80° C. for 90 minutes, then cooled to room temperature. At room temperature, 1.82 ml of 1,5-dimethoxypentane (Aldrich, 11.6 mmol, ratio donor/Mg=0.25 mol/mol) was charged. The mix was heated and kept under stirring for 120 minutes at 50° C., then cooled to room temperature. After that, stirring was discontinued and the liquid siphoned off. Three washings with xylene (100 ml) were performed at 60° C. and then, other three more hexane washings (100 ml) were performed at room temperature. The resulting solid component was discharged and dried under vacuum at about 60° C. for 2 hours.

The solid showed the following characteristics:
Ti: 4.6 wt %
Mg: 16.0 wt %
Cl: 54.0 wt %
1,5-dimethoxypentane: 4.5 wt %

The so prepared catalyst has then been used in the polymerization of ethylene according to the general polymerization procedure. The results are shown in the following Table 1.

TABLE 1

| Experiment No. | Donor | Donor Content [wt %] | Productivity [g PE/g Cat] Time = 2 h | Bulk Density [g/l] | MI E [g/10 min] | MI F [g/10 min] | MFR |
|---|---|---|---|---|---|---|---|
| Exp. 1 | 1,5-DMOP* | 1.2 | 3060 | 233 | 3.68 | 119.0 | 32.4 |
| Exp. 2 | 1,5,-DMOP* | 1.3 | 4270 | 181 | 7.16 | 228.0 | 31.8 |
| Exp. 3 | 1,6-DMOH** | 6.3 | 1070 | 315 | 6.05 | 175.8 | 29.1 |
| Exp. 4 | 1,5-DMOP* | 4.5 | 1100 | 210 | 1.69 | 57.0 | 34.0 |
| Comp. 1 | — | — | 2583 | 235 | 2.46 | 106 | 43.1 |
| Comp. 2 | THF | 4.8 | 2600 | 195 | 2.45 | 95 | 38.8 |
| Comp. 3 | 1,2-DMOE*** | 1.5 | 707 | 218 | 3.75 | 135 | 36.0 |
| Comp. 4 | 1,3-DMOp+ | 2.6 | 1480 | 206 | 3.00 | 106 | 35.3 |
| Comp. 5 | 1,4-DMOB++ | 1.8 | 480 | 185 | 4.50 | 184.5 | 41.0 |

*1,5-DMOP = 1,5-dimethoxypentane
**1,6-DMOH = 1,6-dimethoxyhexane
***1,2-DMOE = 1,2-dimethoxyethane
+1,3-DMOp = 1,3-dimethoxypropane
++1,4-DMOB = 1,4dimethoxybutane

EXAMPLE 5

The catalyst prepared in Comparative Example 1 has then been used in the polymerization of ethylene according to the general polymerization procedure with using 1,5-dimethoxypentane as external donor (ED) (ED/TEA=0.1). The polymer productivity was 2400 [pPE/g Cat 2 hr], bulk density was 223 [g/l], MI $E_{2.16}$ was 3.20 [g/10 min.], MI $F_{21.6}$ was 100.8 [g/10 min.], and MFR was 31.5.

EXAMPLE 6

The catalyst prepared in Comparative Example 1 has then been used in the polymerization of ethylene according to the general polymerization procedure with using 1,6-dimethoxyheptane as external donor (ED) (ED/TEA=0.1). The polymer productivity was 2500 [pPE/g Cat 2 hr], bulk density was 233 [g/l], MI $E_{2.16}$ was 2.50 [g/10 min.], MI $F_{21.6}$ was 77.5 [g/10 min.], and MFR was 31.0.

EXAMPLE 7

The catalyst prepared in Example 1 has then been used in the polymerization of ethylene according to the general polymerization procedure with using THF as external donor (ED/TEA=0.1). The polymer productivity was 1970 [pPE/g Cat 2 hr], bulk density was 273 [g/l], MI $E_{2.16}$ was 1.61 [g/10 min.], MI $F_{21.6}$ was 57.0 [g/10 min.], and MFR was 34.1.

EXAMPLE 8

The catalyst prepared in Example 1 has then been used in the polymerization of ethylene according to the general polymerization procedure with using TiBA as alkylaluminum. The polymer productivity was 1300 [pPE/g Cat 2 hr], bulk density was 230 [g/l], MI $E_{2.16}$ was 0.8 [g/10 min.], MI $F_{21.6}$ was 26.7 [g/10 min.], and MFR was 33.3.

EXAMPLE 9

Polymerization of Ethylene Copolymer

A 1.5 L stainless-steel autoclave equipped with a stirrer, temperature and pressure indicator, feeding line for ethylene, 1-butene and hydrogen, and a steel vial for the injection of the catalyst, was purified by fluxing pure nitrogen at 70° C. for 60 minutes. It was then washed with iso-butane, heated to 75° C. and finally loaded with 600 ml of iso-butane, 125 ml of 1-butene, ethylene (7.0 bars, partial pressure) and hydrogen (3.0 bars partial pressure).

In a 50 cm³ three neck glass flask were introduced in the following order, 27 cm³ of anhydrous hexane, 4 mmol of TEA in hexane solution and 4.7 mg of solid catalyst prepared pursuant Example 1. They were mixed together and stirred at room temperature for 5 minutes and thereafter introduced in the reactor through the steel vial by using a nitrogen overpressure.

Under continuous stirring, the total pressure was maintained constant at 75° C. for 120 minutes by feeding ethylene.

At the end of that time period the reactor was depressurized and the temperature was dropped to 30° C. The recovered polymer was dried at 70° C. under vacuum and weighted. The polymer yield was 62.9 g and the polymer bulk density was 163 g/l, eta value was 1.56 [dl/g], MI $E_{2.16}$ was 3.04 [g/10 min.], MI $F_{21.6}$ was 100.3 [g/10 min.], and MFR was 33.0.

The invention claimed is:

1. A catalyst component for the polymerization of olefins, comprising: titanium, magnesium, a halogen, and an alpha-omega-diether selected from the group consisting of 1,5-dimethoxypentane, 1,5-diethoxypentane, 1,5-dipropoxypentane, 1,5-dicyclopentoxypentane, 1,5-diphenoxypentane, 1,6-dimethoxyhexane, 1,6-diethoxyhexane, 1,6-dipropoxyhexane, 1,6-dicyclopentoxyhexane, 1,6-diphenoxyhexane, 1,7-dimethoxyheptane, 1,7-diethoxyheptane, 1,8-dimethoxyoctane, 1,8-diethoxyoctane, 1,9-dimethoxynonane, 1,9-diethoxynonane, 1,10-dimethoxydecane, and 1,10-diethoxydecane.

2. The catalyst component of claim 1 wherein the titanium derives from a titanium compound containing at least one Ti-halogen bond and wherein the magnesium derives from magnesium chloride.

3. The catalyst component of claim 2 wherein the titanium compound and the alpha-omega-diether are supported on the magnesium chloride.

4. A process for preparing a catalyst component of claim 1, wherein the magnesium derives from a magnesium compound comprising a $MgCl_2$-nROH adduct, where n is from 1 to 6, and ROH is an alcohol, wherein the magnesium compound is reacted with an alpha-omega-diether, and wherein the reaction product thereafter is reacted with an excess of $TiCl_4$.

5. A catalyst for polymerizing olefins of the general formula $CH_2$=CHR, in which R is hydrogen or a hydrocarbon radical with 1 to 12 carbon atoms, comprising the reaction product of:
   a) a solid catalyst component of claim 1;
   b) an alkylaluminum compound; and
   c) optionally, an external electron donor compound.

6. The catalyst of claim 5 wherein the alkylaluminum compound is a trialkylaluminum compound selected from the group consisting of trimethylaluminum (TMA), triethylaluminum (TEA), triisobutylaluminum (TIBA), tri-n-butylaluminum, tri-n-hexylaluminum, and tri-n-octylaluminum, or an alkylaluminum halide selected from the group consisting of diethylaluminum chloride (DEAC), diisobutylaluminum chloride, aluminium sesquichloride, and dimethylaluminum chloride.

7. The catalyst of claim 5 wherein the external donor compound is selected from the group consisting of ethers, esters, amines, ketenes, nitriles, silanes and mixtures thereof.

8. The catalyst of claim 5 wherein the external donor compound is a silicon compound of the general formula $R_a^5 R_b^6 Si(OR^7)_c$, where a and b are integers from 0 to 2, c is an integer from 1 to 3 and the sum (a+b+c) is 4; $R^5$, $R^6$, and $R^7$, are alkyl, cycloalkyl or aryl radicals with 1 to 18 carbon atoms optionally containing one or more heteroatoms.

9. A process which comprises polymerizing an olefin in the liquid or gas phase in the presence of the catalyst of claim 5.

10. A process which comprises polymerizing an olefin in a slurry polymerization in an inert medium carried out continuously within stirred tank reactors or in loop reactors in the presence of a catalyst of claim 5, wherein the catalyst has a particle size (diameter) of less than 40 μm.

11. A process which comprises polymerizing an olefin in a gas-phase polymerization carried out in an agitated or fluidized bed gas-phase reactor in the presence of a catalyst of claim 5, wherein the catalyst has a particle size (diameter) of more than 40 μm.

12. A catalyst for polymerizing olefins of the general formula $CH_2$=CHR, in which R is hydrogen or a hydrocarbon radical with 1 to 12 carbon atoms, comprising the reaction product of:
   a) a solid catalyst component comprising Ti, Mg, and Cl;
   b) an alkylaluminum compound; and
   c) an alpha-omega-diether compound selected from the group consisting of 1,5-dimethoxypentane, 1,5-diethoxypentane, 1,5-dipropoxy-pentane, 1,5-dicyclopentoxypentane, 1,5-diphenoxypentane, 1,6-dimethoxyhexane, 1,6-diethoxyhexane, 1,6-dipropoxyhexane, 1,6-dicyclopentoxyhexane, 1,6-diphenoxyhexane, 1,7-dimethoxyheptane, 1,7-diethoxyheptane, 1,8-dimethoxyoctane, 1,8-diethoxyoctane, 1,9-dimethoxynonane, 1,9-diethoxynonane, 1,10-dimethoxydecane, and 1,10-diethoxydecane.

* * * * *